(12) United States Patent
Shen

(10) Patent No.: US 8,521,184 B2
(45) Date of Patent: Aug. 27, 2013

(54) METHOD FOR ESTIMATING THE GEOGRAPHICAL LATITUDE, LONGITUDE AND ELEVATION OF A MOBILE ELECTRONIC TELECOMMUNICATION DEVICE (TD)

(76) Inventor: James Shen, Toronto (CA)

( * ) Notice: Subject to any disclaimer, the term of this patent is extended or adjusted under 35 U.S.C. 154(b) by 47 days.

(21) Appl. No.: 13/304,474

(22) Filed: Nov. 25, 2011

(65) Prior Publication Data

US 2013/0137448 A1     May 30, 2013

(51) Int. Cl.
*H04W 24/00*     (2009.01)

(52) U.S. Cl.
USPC .............. 455/456.2; 455/457; 455/67.11; 455/404.2; 455/456.5; 709/203

(58) Field of Classification Search
USPC .. 455/456.1–457, 404.1–404.2, 67.11–67.16, 455/423–425; 709/203–206
See application file for complete search history.

(56) References Cited

U.S. PATENT DOCUMENTS

| | | | | |
|---|---|---|---|---|
| 6,636,744 | B1 * | 10/2003 | Da | 455/456.1 |
| 6,845,239 | B1 * | 1/2005 | Sato et al. | 455/456.1 |
| 7,043,255 | B1 * | 5/2006 | Tiwari | 455/456.1 |
| 7,312,752 | B2 * | 12/2007 | Smith et al. | 342/464 |
| 7,317,926 | B1 * | 1/2008 | Cloutier et al. | 455/456.3 |
| 7,886,033 | B2 * | 2/2011 | Hopmann et al. | 709/223 |
| 8,116,783 | B2 * | 2/2012 | Duxbury et al. | 455/456.1 |
| 2003/0050015 | A1 * | 3/2003 | Kelly et al. | 455/67.4 |
| 2008/0037536 | A1 * | 2/2008 | Padmanabhan et al. | 370/389 |
| 2009/0138336 | A1 * | 5/2009 | Ashley et al. | 705/10 |

* cited by examiner

*Primary Examiner* — Sharad Rampuria

(57) ABSTRACT

A method for estimating the geographical latitude, longitude and elevation of a mobile electronic telecommunication device (TD) is provided. The method draws random information over a given time period from multiple responders. A triangulation and signal quality analysis is performed to determine the possible location of the TD. Using the statistical information and its analysis the location (x, y and z coordinates) as well as the velocity and acceleration of the device is estimated. The present invention provides extremely accurate location information.

8 Claims, 1 Drawing Sheet

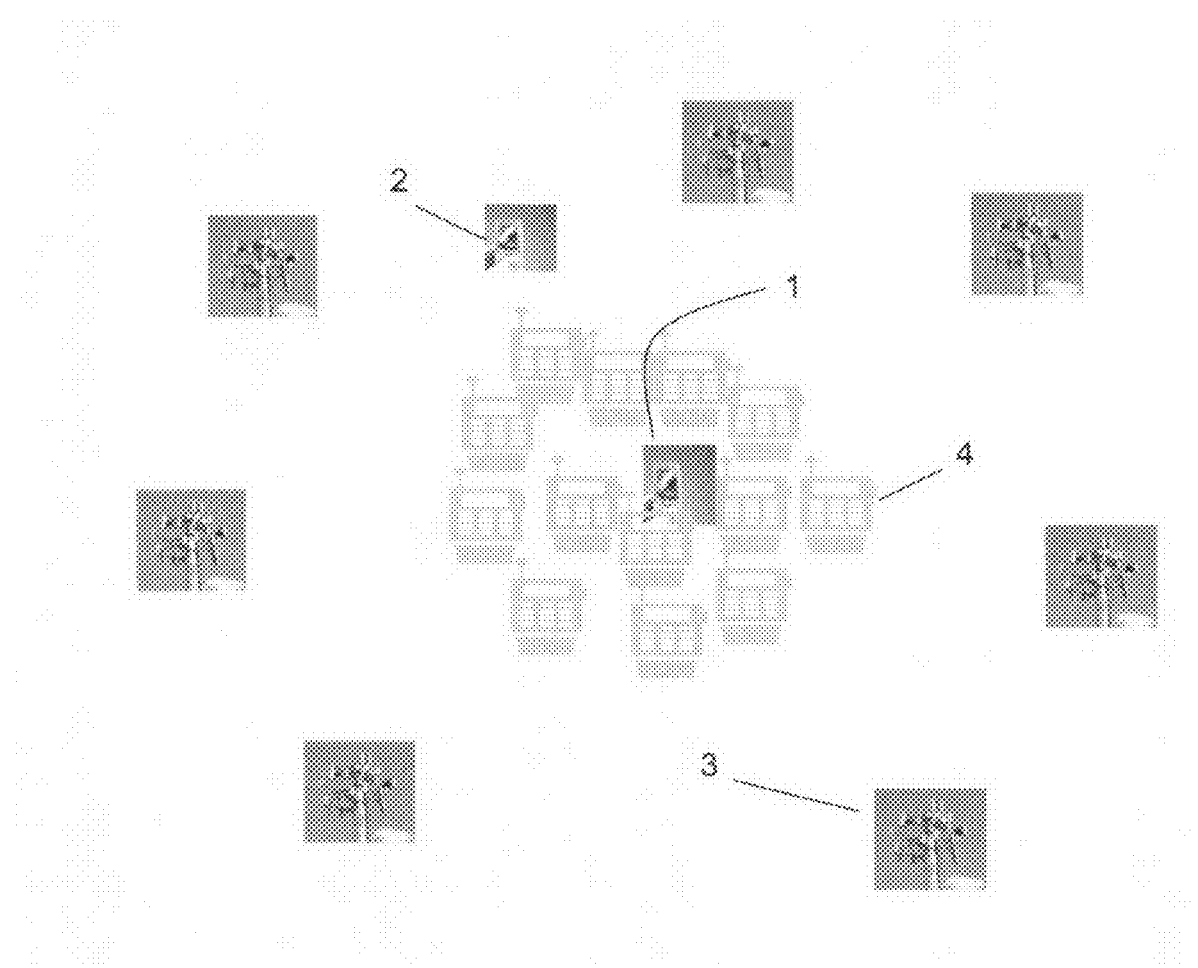

METHOD FOR ESTIMATING THE GEOGRAPHICAL LATITUDE, LONGITUDE AND ELEVATION OF A MOBILE ELECTRONIC TELECOMMUNICATION DEVICE (TD)

FIELD OF INVENTION

The present invention relates to a method for estimating the geographical latitude, longitude and elevation of a mobile electronic telecommunication device (TD), within a confidence interval, as well as for estimating its speed and direction.

BACKGROUND OF THE INVENTION

The popularity of electronic telecommunication devices (TDs) has increased tremendously in recent years. For example, it has been estimated that there are above five billion cell phone subscribers in the world. This increase in popularity also brings with it the need for effective and accurate locating methods of these TDs. The need to determine the location of a mobile telecommunication device may come from emergency services, public safety, and other situations such as lost of the mobile communication device.

Locating of mobile telecommunication devices consists in determining the geographical latitude, longitude and elevation of a mobile electronic telecommunication device (TD), within a confidence interval. A number of technologies have been introduced to determine the geographic location of a mobile device.

There are three most commonly used location technologies: stand-alone, satellite-based, and terrestrial radio-based. The method introduced in this patent is radio-based which typically uses base stations emitting radio signals to the mobile receiver to determine the position of its user. Signals can also be emitted from the mobile device to the base. For example, triangulation and/or arcuation methods that measure the signal strength received from three or more neighboring cells stations (Sensors) can be used to determine an approximate location of the mobile station.

Unfortunately, there are some challenges in determining the exact location of the mobile phone caller. Usually the information from the closest sensor (cell tower) can provide a very general indication of the caller's location; however it is not specific enough to determine the exact location which could be critical in situations such as emergency situations, rescue operations or loss of the telecommunication device.

There is a need for improved methods to locate mobile telecommunication devices more accurately and with a high degree of confidence.

SUMMARY OF THE INVENTION

In the present invention, a method for locating a mobile telecommunication device (TD) is disclosed. The method uses information data collected and processed by the telecommunication device (TD) or a remote data processing station over a given time period (T), to estimate the (x, y, z) coordinate of the TD. A probability distribution of the device location is generated. In addition information that may affect the signal quality is collected. This information is used to generate a signal quality factor or S-factor. The signal factor may include sub factors related to ambient conditions and electronic performance of telecommunication device. The mean value and the standard deviation of the x, y and z coordinates as well as the S-factor provides a confidence interval for the estimate of the location, which minimizes the expected distance error between the estimated and actual location. The present invention provides extremely accurate location information. Other features and advantages of the present invention will become more evident from the following discussion and drawings.

BRIEF DESCRIPTION OF THE DRAWINGS

The locating method according to the present invention will now be described by way of example only, reference is had to the accompanying drawings in which:

FIG. 1 illustrates a schematic diagram of a first embodiment of the locating method.

DETAILED DESCRIPTION OF THE INVENTION

This locating method, illustrated in FIG. 1, uses the following information collected and processed by a telecommunication device (TD) 1 or a remote data processing station 2 over a given time period (of length T), to estimate the (x, y, z) coordinate of the TD.

a) The stationary (x, y, and z) coordinates of the responder 3;
b) The time of the Ping—Packet Internet Groper—and that of the response;
c) The distance between the TD and the responder based on the round-trip-time of each response (the time between each Ping emitted by the TD, and the time of the response to the Ping);
d) The strength of the response signal, S1;
e) The ambient conditions of the telecommunication device, S2;
f) Electronic performance indicators such as CPU performance and device power level, S3.
g) Other information that may affect the quality of the signal, SN.

The method randomly draws multiple sets of three responses, and from each set it generates a possible location 4 (x, y, and z coordinates) of the TD, using standard triangulation. The table below shows signal responses of at least three responders which are used to estimate the probable position coordinate per responder at time $t_i$. The sub factors S1, S2, S3, and S4, are weighted and combined to generate the signal quality factor or S-factor. By using the estimated coordinates and the signal quality factor, a probable position for the telecommunication device is generated. Through this process a large set of possible locations are generated which comprise an empirical probability distribution of the actual location. The mode, mean and standard deviation of the distribution are then reported and used to indicate the most likely location of the device at time t. By repeating the same process at a future time, $t_{i+1}$, the velocity, acceleration and direction of the mobile telecommunication device can also be determined.

The mode of the x, y and z coordinates provide an estimate of the location. The mean value and the standard deviation provides a confidence interval for the estimate of the location, which minimizes the expected distance error between the estimated and actual location. The S-factor provides information on signal quality with preference to high strength response signals.

To test whether the TD is stationary or not, a regression analysis is performed to determine whether the distribution of the (x, y, and z) points exhibits any relation to the time of the response. If it exhibits a relation then the expected direction and speed are reported. If not, the TD is assumed to be stationary. FIG. 1 is a diagram illustrating possible locations of a telecommunication device using the method disclosed in the present invention.

| Responder | Estimated coordinate per responder at time t X (t), Y (t), Z (t) | S-factor S = (S1, S2, ... SN) | Probable position P (t) = ($X_t, Y_t, Z_t, S_t$) | Standard deviation, Mean, Mode |
|---|---|---|---|---|
| | $t_i$ | | | $\sigma(t_i)$, P $(t_i)$, M $(t_i)$ |
| 1 | $X_1(t_i), Y_1(t_i), Z_1(t_i)$ | $S_1(t_i)$ | $p_1(t_i)$ | |
| 2 | $X_2(t_i), Y_2(t_i), Z_2(t_i)$ | $S_2(t_i)$ | $p_2(t_i)$ | |
| 3 | $X_3(t_i), Y_3(t_i), Z_3(t_i)$ | $S_3(t_i)$ | $p_3(t_i)$ | |
| | $t_{i+1}$ | | | $\sigma(t_{i+1})$, P $(t_{i+1})$, M $(t_{i+1})$ |
| 1 | $X_1(t_{i+1}), Y_1(t_{i+1}), Z_1(t_{i+1})$ | $S_1(t_{i+1})$ | $p_1(t_{i+1})$ | |
| 2 | $X_2(t_{i+1}), Y_2(t_{i+1}), Z_2(t_{i+1})$ | $S_2(t_{i+1})$ | $p_2(t_{i+1})$ | |
| 3 | $X_3(t_{i+1}), Y_3(t_{i+1}), Z_3(t_{i+1})$ | $S_2(t_{i+1})$ | $p_3(t_{i+1})$ | |

Therefore what is claimed is:

1. A method for estimating the geographical latitude, longitude and elevation of a mobile electronic telecommunication device (TD), the method comprising:
    drawing randomly multiple sets of three responses;
    drawing of responses include the time of the Ping—Packet Internet Groper—and that of the response; performing signal analysis of said responses; and the distance between the TD and the responder based on the round-trip-time of each response;
    generating from each set of responses a possible location (x, y, and z coordinates) of the TD;
    generating a signal quality factor;
    estimating the possible location for the mobile device;
    generating statistical information from the set of generated possible locations;
    selecting the most accurate location of the TD based on predetermined statistical parameters;
    performing statistical analysis on the collected statistical information to determine whether the TD is stationary or not;
    determining the velocity and acceleration if the telecommunication device is not stationary.

2. The method of claim 1 wherein said drawing of responses includes stationary (x, y, and z) coordinates of the responder.

3. The method of claim 1 wherein said drawing of responses includes the distance between the TD and the responder based on the round-trip-time of each response (the time between each Ping emitted by the TD, and the time of the response to the Ping).

4. The method of claim 1 wherein said signal analysis includes determining a signal quality factor including information on signal strength, ambient conditions, electronic performance of telecommunication device and other factor affecting the quality of the signal.

5. The method of claim 1 wherein said estimating of the mobile telecommunication device location is based on position coordinates determined using standard triangulation and the corresponding signal quality factor.

6. The method of claim 1 wherein said selecting of the location is based on the mode, mean, and standard deviation of probable device locations.

7. The method of claim 1 wherein said performing statistical analysis includes a regression analysis to determine if the TD is stationary or not.

8. The method of claim 1 wherein said analysis determines the velocity and acceleration of said TD in the case it is not stationary.

* * * * *